Jan. 21, 1964 A. J. MICHALIK 3,118,317
ROLLER CHAIN WITH RESERVE PLATES
Filed Oct. 11, 1961 2 Sheets-Sheet 1
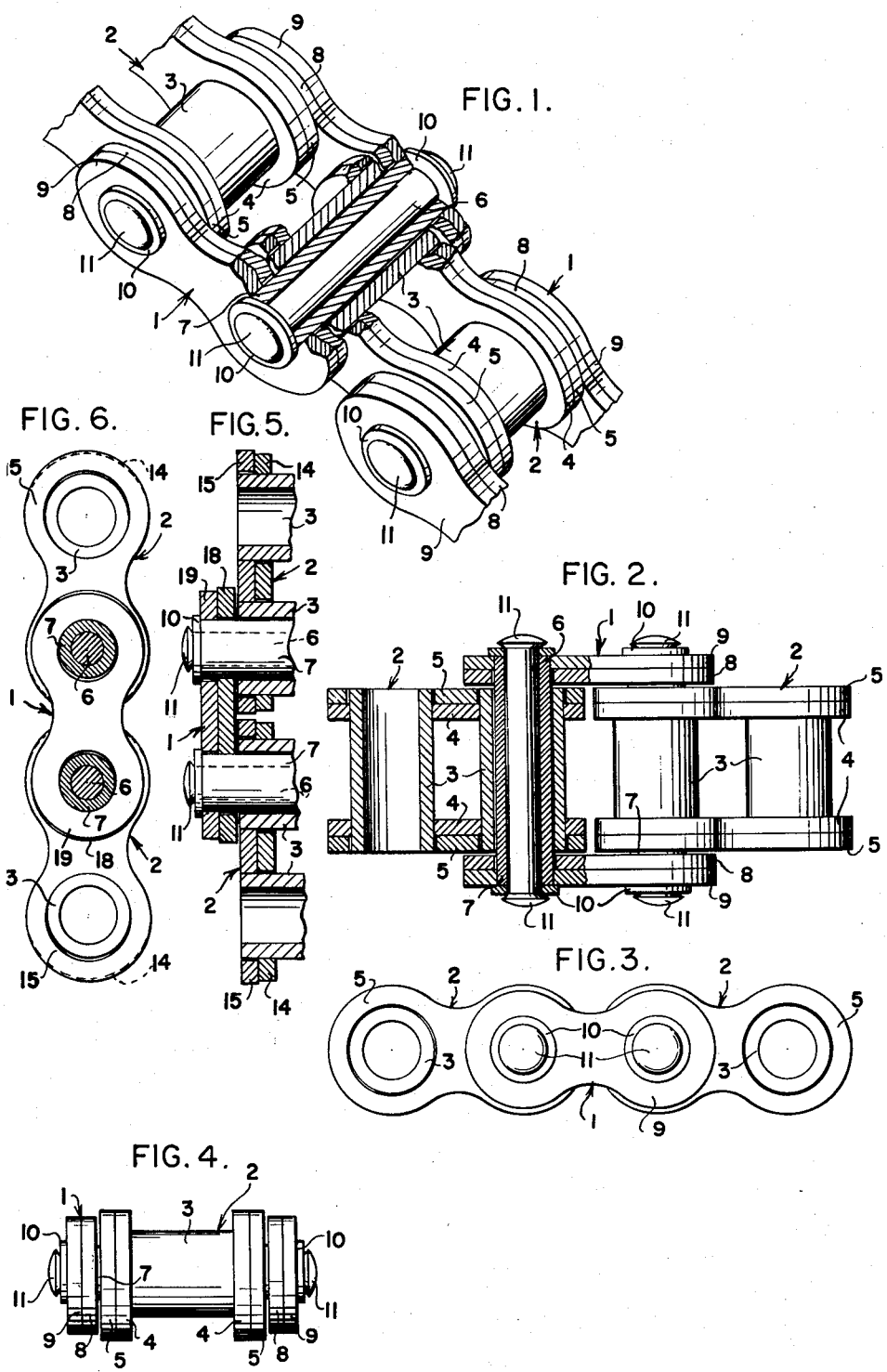

Jan. 21, 1964 A. J. MICHALIK 3,118,317
ROLLER CHAIN WITH RESERVE PLATES
Filed Oct. 11, 1961 2 Sheets-Sheet 2

United States Patent Office 3,118,317
Patented Jan. 21, 1964

3,118,317
ROLLER CHAIN WITH RESERVE PLATES
Anthony J. Michalik, Springfield, Mass., assignor to Chain Belt Company, Milwaukee, Wis., a corporation of Wisconsin
Filed Oct. 11, 1961, Ser. No. 144,484
6 Claims. (Cl. 74—250)

This invention relates to roller chain for driving purposes or for tension linkages where the ultimate in dependability of the chain is required. The term roller chain refers to chain which is provided with rollers but the term as in current usage also includes the same chain without rollers.

The roller chain of the present invention is particularly intended for use in the operation of the control surfaces of aircraft and in any other applications requiring near-absolute dependability within a given period of service.

According to the present invention, the near-absolute dependability referred to is made possible by the fact that the fatigue life of the chain is remarkably predictable insofar as the cyclic loads are concerned. That is, for a given aircraft operating for a given number of hours, the number of cycles of load applied to the chain can be determined within upper and lower limits.

Accordingly, if the chain of the present invention is inspected at intervals not greater than the interval applicable to the lower limit referred to, and there has been no failure of the working plates, the entire set of reserve plates have been under no load and the chain may be considered safe for the next succeeding interval of service. However, if a failure of a working plate is found upon inspection, the entire chain is replaced.

The chain of the present invention is provided with adjoining pairs of bushing plates and pin plates throughout, each pair including one working plate and a reserve plate. The reserve plates of the chain are dimensioned and assembled on the respective pins and bushings so that they are normally under no load. However, if and when a working plate fails, the adjoining reserve plate then serves to carry the load until the chain is replaced upon inspection at the end of a given period of service.

The inspection procedure may or may not require removal of the chain and only require close visual inspection of both sides of the chain. According to the invention, all working plates are assembled on the respective pins and bushings with a minimum press fit. This press-fit within limits provides an already known improvement in the fatigue resistance of the plates and with an established minimum press fit as mentioned, any failure of a working plate will usually be in the form of a relatively large fracture which may be readily detected visually. However, and according to the invention, the adjoining reserve plate limits this fracture to the extent that no part of the fractured plate breaks loose of the chain to interfere with the operation of the chain over the sprocket or to become lodged in and jam other mechanisms of the aircraft.

Several arrangements of the pin plates and bushing plates are shown in the accompanying drawings wherein either or both the working pin plates and working bushing plates are located on the outside as will be described for ease of inspection or toward the inside near the chain joint as will be described to minimize pin bending.

In the drawings:

FIGURE 1 is a perspective view of a length of the chain embodying the invention with parts thereof broken away and sectioned to show the construction of the chain;

FIG. 2 is a partially sectioned plan view of a part of the chain shown in FIG. 1 to show the relative dimensions of the working plates and reserve plates;

FIG. 3 is a side elevation of the length of chain shown in FIG. 2;

FIG. 4 is an end elevation of the chain shown in FIG. 3;

FIG. 5 is a cross-section of an alternate embodiment of the invention;

FIG. 6 is a side elevation of the chain shown in FIG. 5 with the pins in section to show their fit on the plates;

Figure 7:
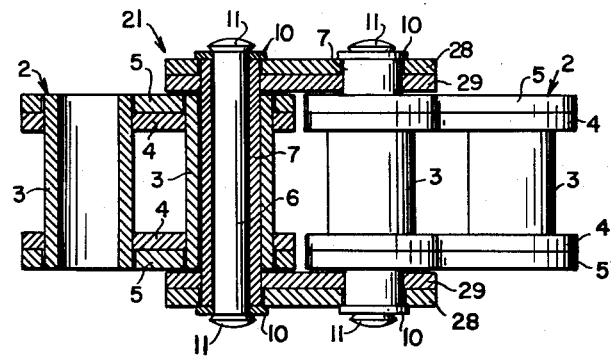
FIG. 7 is a view similar to FIG. 2 and shows the reserve pin plates at the ends of the pins and the working pin plates at the joints of the chain or alongside the bushing links which are the same as in FIGS. 2 and 3.
Figure 8:
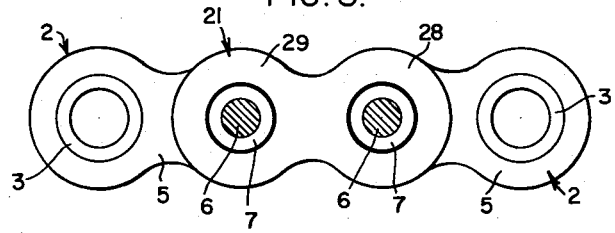
FIG. 8 is a view similar to FIG. 3 of the chain shown in FIG. 7.
Figure 9:
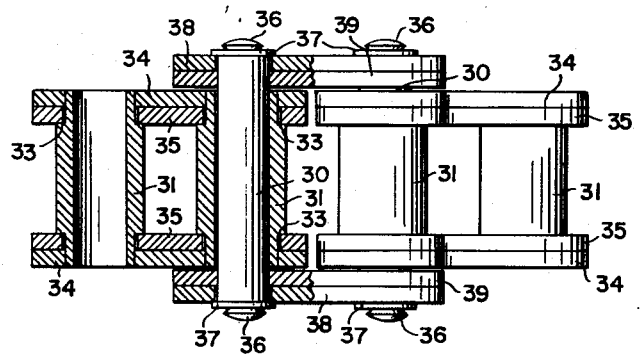

FIG. 9 is a view similar to FIG. 7 and shows the chain with the reserve pin plates on the outside of the chain as in FIGS. 7 and 8 and the working bushing plates at the ends of the bushings. In this chain, the working plates are next to each other to minimize pin bending. The pin is solid as shown and the bushing is stepped at the ends to provide a larger center portion which maintains the spacing of the bushing reserve plates.

Figure 10:
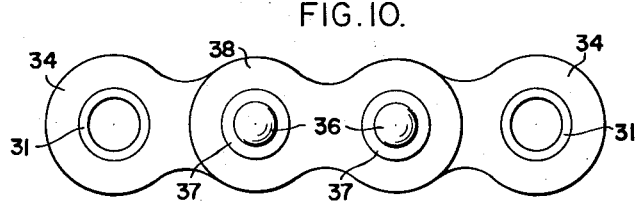

FIG. 10 is a view similar to FIG. 3 of the chain shown in FIG. 9.

The chain shown in FIGS. 1–4 of the drawings includes the pin links 1 and bushing links 2. Each bushing link 2 includes a pair of bushings 3 and the inner and outer bushing plates 4 and 5 respectively assembled on the corresponding ends of bushings 3.

The pins 6 of each pin link 1 are provided with outer sleeves 7 and extend through the corresponding bushings of bushing links 2. The inner and outer pin plates 8 and 9 are assembled on the ends of sleeves 7 and are held on the sleeves by the washers 10 mounted on the pins at the ends of the sleeves and secured by the headed ends 11 of the pins.

According to the invention, the inner bushing plates 4 and the outer pin plates 9 are assembled on the respective bushings 3 and sleeves 7 with the usual press-fit which preloads the plates in accordance with well-known principles, and the outer bushing plates 5 and inner pin plates 8 are assembled on the respective bushings 3 and sleeves 7 with a given fit as will be described so that plates 5 and 8 are subject to no tensile load in the normal operation of the chain.

In the chain shown in FIGURES 1–4 the holes of the outer bushing plates 5 are spaced or provided with a pitch approximately equal to that of plates 4 and the holes are slightly larger than the bushings 3 so that they fit the bushings loosely. However, the oversize required need not be as great or visible as shown in the drawings, but need only be enough so that plates 4 are and the plates 5 are not under tensile load in service. The plates 5 as shown are held on the bushings by the inner pin plates 8 which overlie plates 5.

Plates 8 similarly have holes having a pitch or spacing which corresponds with that of the holes of plates 9 and a size just enough larger than the outer diameter of sleeves 7 so that plates 9 are and the plates 8 are not under tensile load in normal chain service. The space between the ends of bushings 3 and plates 8 should also be as little as possible so that plates 5 cannot move off of the ends of the bushings.

According to the invention, the chain operates so that only plates 4 and 9 are in tension when the chain is loaded. Since the chain is intended for use in aircraft, severe restrictions as to weight and size must be observed and the invention contemplates operation with such loading near the established limits for the first given number of cycles. If a plate 4 or 9 fails, the load carried by that plate will be automatically transferred to the corresponding reserve plate with only nominal lengthening of the chain.

The closely followed inspection and maintenance procedures which are customary are also relied on so that the chain is replaced after a given period of service. If such replacement is effected regardless of the apparent condition of the chain, the reliability factor of the chain will aproach 100% or unity for the reason that only failure of both plates of a pair will result in failure of the chain.

For the inspection procedure referred to, plates 4 and 9 are located so that they can best be seen. The bushing plates 4 are located toward the center of the chain and the pin plates 9 are located toward the outside of the chain. These plates are thus separated or spaced so that an increased bending movement is effectively placed on pin 6 and sleeve 7.

This requires the use of a stronger pin but presents no difficulty. The use of the hardened sleeve 7 is illustrative of one method of providing the increased bending strength required.

In the alternative form of the invention shown in FIGS. 5 and 6, the bushing plates 14 and 15 have the same hole size but the holes are of a slightly different pitch. Specifically, the working plate 14 located toward the center of the chain has a pitch which is slightly shorter and the reserve plate 15 at the end of the bushing has a slightly longer pitch. When assembled on bushings 3 as shown, the working plates 14 are immediately placed under some tension, the parts of plates 15 between the bushings being correspondingly compressed.

The holes of pin plates 18 and 19 are similarly of different pitch but are of approximately the same size and are similarly mounted on sleeves 7 so that the shorter working plates 19 are under some tension and the longer plates 18 are under some compression.

The embodiment of the invention of FIGS. 5 and 6 allows the working plates to be inspected as in the embodiments of FIGS. 1–4. The reserve plates 15 and 18 are positively secured on bushings 3 and sleeves 7 respectively, and the preloading of the working plates 14 and 19 is of considerable advantage in extending the load-carrying capacity of the chain.

In the chain shown in FIGS. 7 and 8 the bushing links 2 are identical with the bushing links 2 of the chain shown in FIGS. 1–4. The pin links 21 include the pins 6 with outer sleeves 7 and end washers 10 secured by the headed ends 11 of the pins. The reserve pin plates 28, however, are located at the ends of the pins and the working plates 29 are located on the pins adjacent to the joint of the chain. In the chain construction of FIGS. 7 and 8 the working plates 4 and 29 are located closer together to reduce pin-bending, if necessary. The inspection of working plates 29, however, may be only slightly more inconvenient than in the chain of FIGS. 1–4.

In the chain shown in FIGS. 9 and 10 the working plates of the respective bushing links and pin links are located next to each other on each side of the chain joint to minimize bending of the pin 30 which is shown as a solid pin.

The bushings 31 have reduced end portions to provide annular shoulders 33 spaced from the ends of the bushings a distance equal to the width of a pair of bushing plates 34 and 35. The workng bushing plates 34 fit tightly on the ends of bushings 31 and the reserve plates 35 fit loosely on the reduced portions between plates 34 and shoulders 33 which latter serve to keep the reserve plates 35 in place.

The pins 30 have heads 36 which secure the end washers 37 in place. The reserve pin plates 38 are assembled on the pins next to washers 36 and the working pin plates 39 are located on the pins next to the working bushing plates 34 as in FIGS. 7 and 8.

The pins 30 as shown are solid. However, in order to provide against possible fatigue failure of the pin and for a completely "fail safe" chain according to the invention the pin construction of FIGS. 1–8 should be substituted for or used instead of solid pin 30. The term "pins" in the appended claims includes pins of either construction.

Various embodiments of the invention may be employed within the scope of the following claims.

I claim:

1. A roller chain comprising bushing links and pin links, each bushing link including a pair of bushings and two pairs of bushing plates having spaced holes and assembled over corresponding ends of the bushings to join the same, each pin link including a pair of pins and two pairs of pin plates having spaced holes and assembled over corresponding ends of the pins to join the same, each of said pairs of plates including a working plate and a reserve plate, the working plates being fitted tightly on the respective bushings and pins and the reserve plates being just sufficiently loose on the respective bushings and pins so that the working plates normally carry all the load applied to the chain and each reserve plate is disposed to carry the load upon failure of the working plate with which it is paired before parts of the failed working plate interfere with the operation of the chain.

2. The invention of claim 1 wherein the holes of the working plates are initially formed smaller than the respective pins and bushings and the plates are fitted thereon with a press-fit within given minimum as well as maximum limits so that any failure of a working plate develops and appears immediately as a wide fracture which is readily detected by visual inspection.

3. A roller chain comprising bushing links and pin links, each bushing link including a pair of bushings and two pairs of bushing plates having spaced holes and assembled over corresponding ends of the bushings to join the same, each pin link including a pair of pins and two pairs of pin plates having spaced holes and assembled over corresponding ends of the pins to join the same, each of said pairs of plates including a working plate and a reserve plate, the maximum distance between the holes of the working plates being just sufficiently less than that of the corresponding reserve plates so that the working plates normally carry all the load applied to the chain and each reserve plate is disposed to carry the load upon failure of the working plate with which it is paired before parts of the failed working plate interfere with the operation of the chain.

4. A roller chain comprising bushing links and pin links, each bushing link including a pair of bushings and two pairs of bushing plates having spaced holes and assembled over corresponding ends of the bushings to join the same, each pin link including a pair of pins and two pairs of pin plates having spaced holes and assembled over corresponding ends of the pins to join the same, each of said pairs of plates including a working plate and a reserve plate, the center-to-center distance between the holes of the working plates being just sufficiently less than that of the corresponding reserve plates so that the working plates normally carry all the load applied to the chain and each reserve plate is disposed to carry the load upon failure of the working plate with which it is paired before parts of the failed working plate interfere with the operation of the chain.

5. In a chain for operation under cyclic load conditions which determine the service-life of the chain and to operate with near-absolute dependability for a given period but less than said service-life, said chain including a series of pins and pairs of plates having corresponding holes through which said pins extend, one plate of each pair referred to as the working plate being fitted tightly on the respective pins and the other plate of each pair referred to as the reserve plate being just sufficiently loose on the respective pins so that the working plates normally carry all the load applied to the chain and each reserve plate is disposed to carry the load upon failure of the working plate with which it is paired before parts of the failed working plate interfere with the operation of the chain.

6. The invention of claim 5 wherein the holes of the working plates are initially formed smaller than the respective pins and the plates are fitted thereon with a press-fit within given minimum as well as maximum limits so that any failure of a working plate develops and appears immediately as a wide fracture which is readily detected by visual inspection.

References Cited in the file of this patent

UNITED STATES PATENTS

| | | |
|---|---|---|
| 1,877,339 | Kottlowski | Sept. 13, 1932 |
| 2,628,107 | Schlairet | Feb. 10, 1953 |